(12) United States Patent
Gauthier

(10) Patent No.: US 9,676,388 B2
(45) Date of Patent: Jun. 13, 2017

(54) GRADE LOGIC BRAKING SYSTEM

(71) Applicant: Toyota Motor Engineering & Manufacturing North America, Inc., Erlanger, KY (US)

(72) Inventor: Christopher T. Gauthier, Redondo Beach, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 176 days.

(21) Appl. No.: 14/644,138

(22) Filed: Mar. 10, 2015

(65) Prior Publication Data

US 2016/0264122 A1     Sep. 15, 2016

(51) Int. Cl.
*B60W 30/18*   (2012.01)
*F16H 61/02*   (2006.01)

(52) U.S. Cl.
CPC .  *B60W 30/18136* (2013.01); *B60W 2520/105* (2013.01); *B60W 2540/12* (2013.01); *B60W 2550/142* (2013.01); *B60W 2710/1005* (2013.01); *F16H 2061/0237* (2013.01)

(58) Field of Classification Search
None
See application file for complete search history.

(56) References Cited

U.S. PATENT DOCUMENTS

| | | | |
|---|---|---|---|
| 5,806,642 A | 9/1998 | Harada et al. | |
| 7,853,385 B2 | 12/2010 | Ly | |
| 8,014,925 B2 | 9/2011 | Saitou et al. | |
| 2004/0014565 A1* | 1/2004 | Oshima | B60W 10/06 477/182 |

* cited by examiner

*Primary Examiner* — Justin Holmes
(74) *Attorney, Agent, or Firm* — Christopher G. Darrow; Darrow Mustafa PC

(57) ABSTRACT

A vehicle and methods of braking the vehicle on a downhill grade as automatically implemented by a computing device are disclosed. One method includes detecting application of a vehicle brake and detecting acceleration of the vehicle while the vehicle traverses the downhill grade. Based on detection of the application of the vehicle brake and detection of the acceleration of the vehicle, the method also includes sending a command to downshift a transmission of the vehicle. If, after the downshift of the transmission, the application of the vehicle brake is not detected for a threshold time, the acceleration of the vehicle falls below a threshold acceleration, or the downhill grade falls below a threshold grade, the method can further include sending a command to upshift the transmission.

11 Claims, 3 Drawing Sheets

GRADE LOGIC BRAKING SYSTEM

BACKGROUND

Grade assist or grade logic algorithms function as part of vehicle braking systems to prevent a vehicle from unintentionally accelerating on a downhill grade. Grade logic algorithms can automatically supplement engine braking, for example, by downshifting the vehicle transmission, in order to maintain constant vehicle speed when the vehicle travels on the downhill slope without excessive use of vehicle brakes. In the absence of grade logic, the vehicle could accelerate down the grade due to gravitational forces despite the desire of the driver to maintain vehicle speed.

Existing grade logic algorithms are designed to suspend the transmission-based assistance to engine braking and upshift the transmission if, for example, the engine exceeds a threshold revolution per minute (RPM) level. Though cancellation of grade logic in these situations can prevent engine noise and sluggish vehicle response to driver commands, the vehicle will once again be subject to accelerating on the downhill grade despite the driver's intention to maintain vehicle speed.

SUMMARY

A vehicle including a computing device running a grade logic algorithm is disclosed. The grade logic algorithm can detect application of the vehicle brake while the vehicle traverses a downhill grade, that is, either the driver is applying the vehicle brake or an automated braking system is applying the vehicle brake. The grade logic algorithm can also detect acceleration of the vehicle despite the application of the vehicle brake. Based on detecting both the application of the vehicle brake and the acceleration of the vehicle, the grade logic algorithm can send a command, for example, to a transmission controller, to downshift a transmission of the vehicle in order to supplement engine braking to prevent the vehicle from accelerating on the downhill grade.

In one implementation, a method of braking a vehicle on a downhill grade is disclosed. The method includes detecting application of a vehicle brake while the vehicle traverses the downhill grade; detecting acceleration of the vehicle while the vehicle traverses the downhill grade; and based on detection of the application of the vehicle brake and detection of the acceleration of the vehicle, sending a command to downshift a transmission of the vehicle.

In another implementation, a computing device is disclosed. The computing device includes one or more processors for controlling operations of the computing device and a memory for storing data and program instructions used by the one or more processors. The one or more processors are configured to execute instructions stored in the memory to: detect application of a vehicle brake while a vehicle traverses a downhill grade; detect acceleration of the vehicle while the vehicle traverses the downhill grade; and based on detection of the application of the vehicle brake and detection of the acceleration of the vehicle, send a command to downshift a transmission of the vehicle.

In another implementation, a vehicle is disclosed. The vehicle includes a vehicle brake and a computing device in communication with the vehicle brake. The computing device includes one or more processors for controlling operations of the computing device and a memory for storing data and program instructions used by the one or more processors. The one or more processors are configured to execute instructions stored in the memory to: detect application of the vehicle brake while the vehicle traverses a downhill grade; detect acceleration of the vehicle while the vehicle traverses the downhill grade; and based on detection of the application of the vehicle brake and detection of the acceleration of the vehicle, send a command to downshift a transmission of the vehicle.

BRIEF DESCRIPTION OF THE DRAWINGS

The description herein makes reference to the accompanying drawings wherein like reference numerals refer to like parts throughout the several views, and wherein.

DETAILED DESCRIPTION

A vehicle and methods of braking the vehicle on a downhill grade are described below. One method includes detecting the downhill grade over a predetermined threshold grade, detecting application of a vehicle brake, and detecting acceleration of the vehicle over a predetermined threshold acceleration while the vehicle traverses the downhill grade. Based on detection of the application of the vehicle brake and detection of the acceleration of the vehicle, the method can include sending a command, for example, from a computing device to a transmission controller in the vehicle, to downshift a transmission of the vehicle, adding braking assistance to ongoing engine braking as the vehicle traverses the downhill grade.

Figure 1:
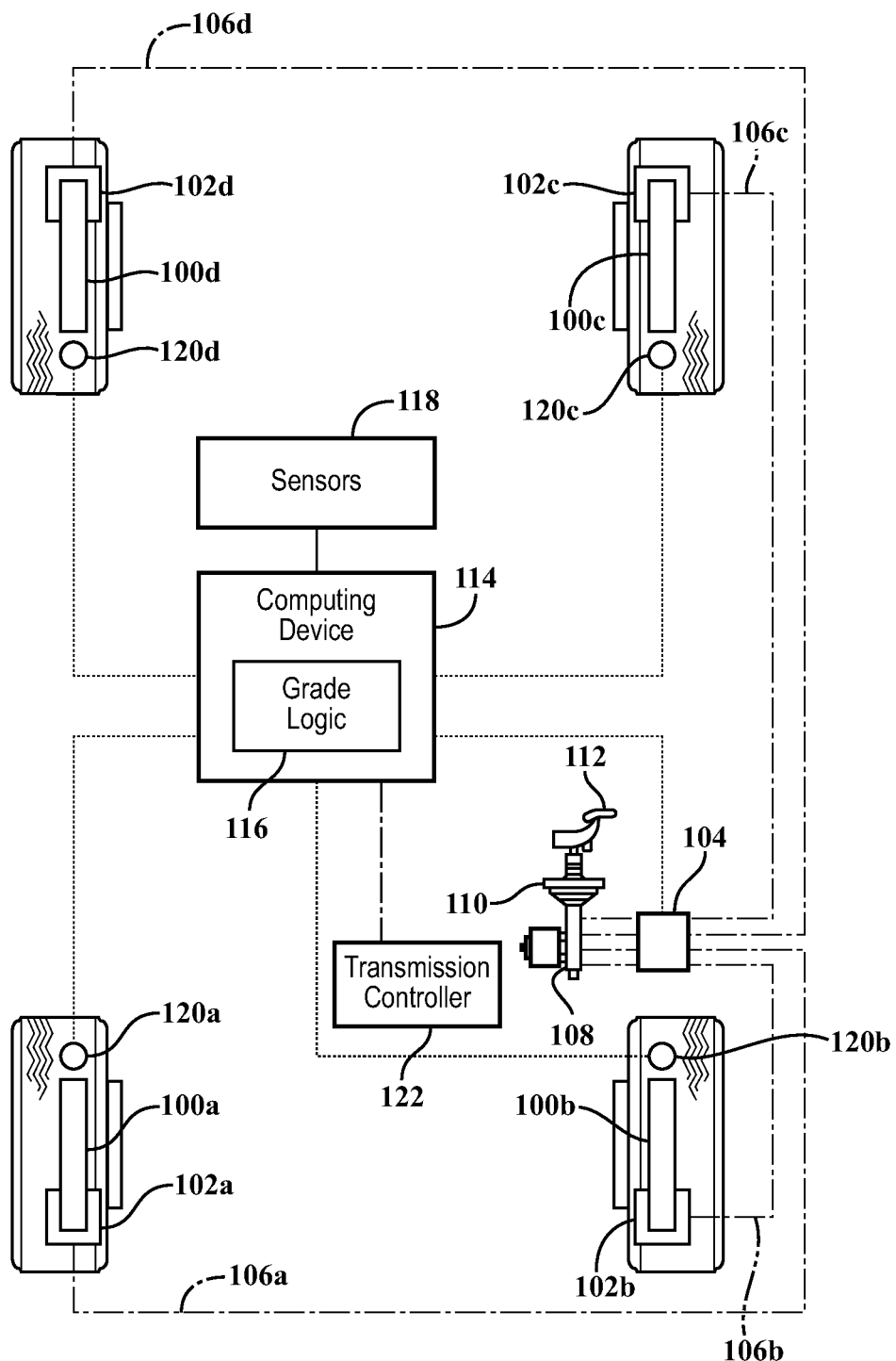
FIG. 1 is a schematic diagram of a vehicle braking system configured to implement a grade logic algorithm on a downhill grade.

FIG. 1 is a schematic diagram of a vehicle braking system configured to implement a grade logic algorithm on a downhill slope. In this example, the vehicle braking system includes four brake discs 100a-d and four brake calipers 102a-d, with each of the brake calipers 102a-d connected to a hydraulic modulation unit 104 by hydraulic brake lines 106a-d. The hydraulic modulation unit 104 is in fluid communication with a master cylinder 108 connected to a brake booster 110 and brake pedal 112. Under normal vehicle brake operation, the brake pedal 112 is operated by the driver of the vehicle to apply braking pressure using the brake calipers 102a-d to the brake discs 100a-d. The hydraulic modulation unit 104 can also be in communication with a computing device 114, for example, in the form of an electronic control unit (ECU), configured to send commands to the hydraulic modulation unit 104 to electronically apply braking pressure.

The computing device 114 can be any type of vehicle-installed or other form of single computing device, or can be composed of multiple computing devices. The processing unit in the computing device can be a conventional central processing unit (CPU) or any other type of device, or multiple devices, capable of manipulating or processing information. The memory in the computing device can be a random access memory device (RAM) or any other suitable type of storage device. The memory can include data that is accessed by the CPU using a bus.

The memory can also include an operating system and installed applications, the installed applications including a grade logic algorithm 116 that permits the CPU to send commands to various vehicle systems to supplement an engine braking process on a downhill slope as described below. The computing device 114 can also include secondary, additional, or external storage, for example, a memory card, flash drive, or any other form of computer readable medium. In one embodiment, the installed applications including the grade logic algorithm 116 can be stored in whole or in part in the external storage and loaded into the memory as needed for processing.

The computing device 114 can also be in communication with various vehicle-based sensors 118. These sensors 118 can be configured to capture data and/or signals related to the operation of a vehicle in respect to its environment. In the examples described below, at least one of the sensors 118 can be an inclinometer, or tilt-sensor, configured to capture angular measurements such that the grade percentage for the road being travelled by the vehicle can be determined. Data and/or signals from the inclinometer can also be used to determine whether the vehicle is traveling uphill or downhill. Other means of determining the road's grade percentage are also possible.

Additional vehicle-based sensors 118 can capture data and/or signals from a brake switch or a brake pedal indicative of whether the brakes of the vehicle are being applied, for example, by the driver manually or by the hydraulic modulation unit 104 automatically in conjunction with an automatic braking system such as an anti-lock braking system (ABS) or a cruise control system. Finally, another set of vehicle-based sensors 118 are wheel speed sensors 120a-d. The grade logic algorithm 116 can be configured to receive wheel speed information from the wheel speed sensors 120a-d in order to determine vehicle acceleration, that is, whether the vehicle is increasing in speed over time. Other means of determining vehicle acceleration are also possible.

The computing device 114 can also be in communication with a transmission controller 122. The transmission controller 122 can send commands, for example, to an automatic transmission, to change between gears of the transmission. Downshifting the transmission, or moving from a higher gear to a lower gear, will slow the vehicle on a downhill grade by supplementing engine braking, where engine braking in general acts to slow the vehicle on a downhill grade based on a restricted or closed engine throttle. Upshifting the transmission on a downhill grade, or moving from a lower gear to a higher gear, will allow the vehicle to increase in speed by decreasing the amount of engine braking.

Figure 2:
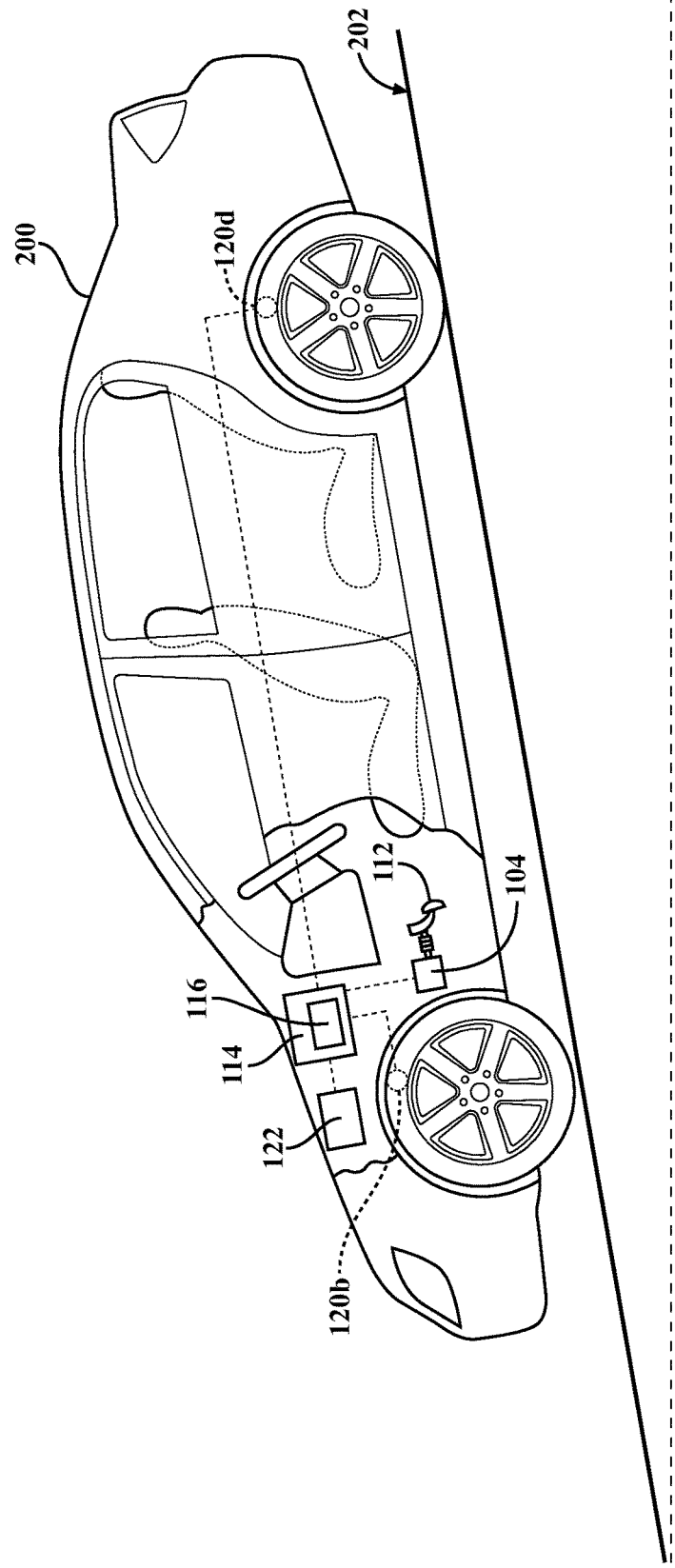
FIG. 2 is a partial cutaway side view of a vehicle traveling on a downhill grade including the vehicle braking system and the grade logic algorithm of FIG. 1.

FIG. 2 is a partial cutaway side view of a vehicle 200 traveling on a downhill grade 202 including the vehicle braking system and the grade logic algorithm 116 of FIG. 1. The left side of the vehicle 200 is shown including the wheel speed sensors 120b and 120d, the hydraulic modulation unit 104, and the transmission controller 122 in communication with the computing device 114 which includes the grade logic algorithm 116. The brake pedal 112, for example, through a pedal position sensor, is also shown in communication with the computing device 114 by way of the hydraulic modulation unit 104, though other configurations allowing the computing device 114 to receive an indication of the position of the brake pedal 112 are also possible.

The presence of the downhill grade 202 in this example can be measured using an inclinometer to approximate the grade percentage, that is, the change in vertical distance travelled over the change in horizontal distance travelled by the vehicle 200 multiplied by a factor of 100. In prior art grade logic systems, which can also be implemented in the example vehicle 200, when the computing device 114 receives an indication of the downhill grade 202 above a predetermined threshold grade, the transmission controller 122 can send a command to downshift the transmission to supplement engine braking, but only until the RPM of the engine increase to a specified threshold RPM, at which point the transmission controller 122 would upshift the transmission to reduce engine noise. In these prior art grade logic systems, the vehicle 200 could continue to accelerate along the downhill grade 202 after the upshift, causing an unwanted "runaway" feeling for the driver of the vehicle 200, and the driver could then apply the vehicle brakes to prevent this feeling, causing wear on the vehicle brakes.

In the improved grade logic algorithm 116 of this disclosure, when the downhill grade 202 is detected, the grade logic algorithm 116 can be configured to determine whether a vehicle brake is being applied. This determination can be based, for example, on the position of the brake pedal 112 or on the status of a brake switch (not shown). If both the downhill grade 202 and the application of a vehicle brake on the downhill grade 202 are detected, the grade logic algorithm 116 can be configured to determine whether the vehicle 200 is continuing to accelerate along the downhill grade 202, using, for example, input from the wheel speed sensors 120a-d. If the downhill grade 202, the application of a vehicle brake, and acceleration of the vehicle 200 along the downhill grade 202 are all detected, the grade logic algorithm 116 can be configured to send a command to the transmission controller 122 to downshift the transmission. The grade logic algorithm 116 of this disclosure is thus designed to be implemented when prior art grade logic systems have stopped providing downshift assistance to engine braking.

Figure 3:
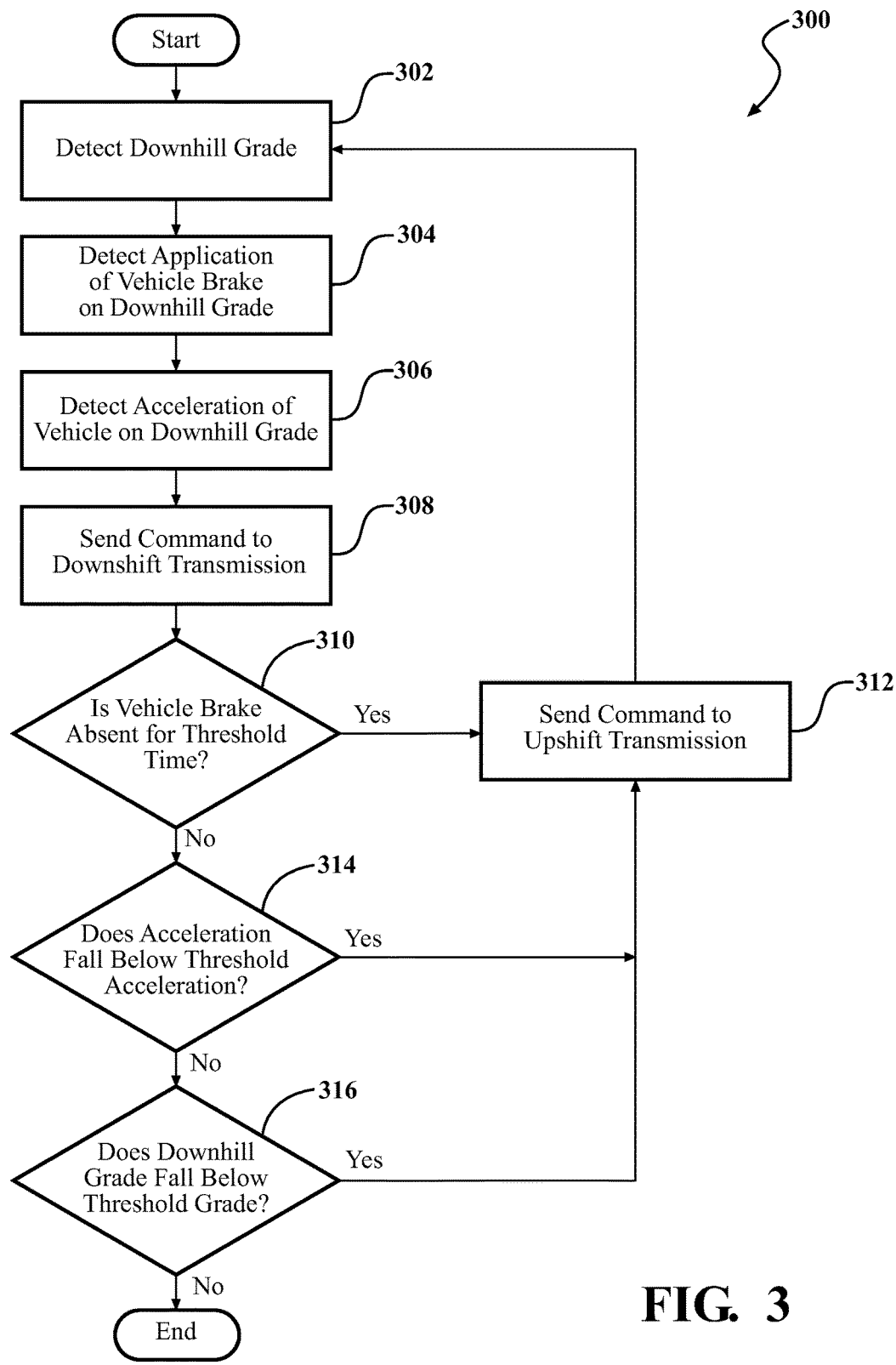
FIG. 3 is flowchart of an exemplary grade logic process implemented using the vehicle braking system and the grade logic algorithm of FIG. 1.

FIG. 3 is flowchart of an exemplary grade logic process 300 implemented using the vehicle braking system and the grade logic algorithm 116 of FIG. 1. In step 302 of the process 300, the grade logic algorithm 116 can detect a downhill grade, such as the downhill grade 202 of FIG. 2, based on, for example, input from an inclinometer. The downhill grade 202 detected can be required to surpass a predetermined threshold grade, such as 2% or 4% or 6%, before the grade logic algorithm 116 is triggered to supplement engine braking. The grade percentage detected can also affect how much or for how long engine brake supplementation is supplied by the grade logic algorithm 116.

In step 304 of the process 300, the grade logic algorithm 116 can detect application of a vehicle brake while the vehicle 200 traverses the downhill grade 202. As described above, detecting application of the vehicle brake can be based on detecting driver input to the brake pedal 112 or on determining the status of a brake switch. Brake switch status can be used to determine that the vehicle brakes are being applied when, for example, the vehicle brakes are being applied automatically by commands from the computing device 114 due to use by another automatic braking system, such as an ABS or cruise control system.

In step 306 of the process 300, the grade logic algorithm 116 can detect acceleration of the vehicle 200 while the vehicle traverses the downhill grade 202. As described above, detecting acceleration of the vehicle can be based on input from one or more wheel speed sensors 120a-d, or on any other means of determining that vehicle speed is increasing over time.

In step 308 of the process 300, the grade logic algorithm 116 can send a command to the transmission controller 122 to downshift the transmission of the vehicle 200 based on the detection of the application of the vehicle brake and detection of the acceleration of the vehicle 200. If the vehicle 200 is on a downhill grade 202 with the vehicle brake being applied, and is still accelerating, the improved grade logic algorithm 116 will send a command to downshift the transmission to supplement engine braking to slow the vehicle 200 regardless of the RPM level of the engine to provide safe operation of the vehicle 200 on the downhill grade 202.

After the transmission downshift, the process 300 continues to decision block 310. In decision block 310, the grade logic algorithm 116 determines whether the vehicle brake is absent for a threshold time, that is, whether the driver or automatic braking system is no longer applying the vehicle brake for a specified time period, for example, three seconds. If the grade logic algorithm 116 detects that the vehicle brakes are not being applied for the threshold time, the process 300 moves to step 312, and the grade logic algorithm 116 sends a command to the transmission controller 122 to upshift the transmission, removing the supplement to engine braking since the vehicle brakes are no longer being applied. Though an exemplary threshold time of 3 seconds is given, the grade logic algorithm 116 can be designed using any threshold time.

If the vehicle brake is not absent for a threshold time, the process 300 moves to decision block 314. In decision block 314, the grade logic algorithm 116 determines whether the acceleration of the vehicle 200 falls below a threshold acceleration. An exemplary threshold acceleration is ten percent of the acceleration of gravity, though other threshold accelerations are possible. If the grade logic algorithm 116 detects that the acceleration of the vehicle 200 falls below the threshold acceleration, the process 300 returns to step 312, and the grade logic algorithm 116 sends a command to the transmission controller 122 to upshift the transmission, removing the supplement to engine braking.

If the acceleration of the vehicle 200 does not fall below the threshold acceleration, the process 300 moves to decision block 316. In decision block 316, the grade logic algorithm 116 determines whether the downhill grade 202 falls below a threshold grade. The threshold grade can be a predetermined grade percentage, such as 2%, 4%, 6%, 8%, or 10%, or a change between specific ranges of grade percentages, as different threshold grade values can affect implementation of the grade logic algorithm 116. If the downhill grade 202 does not fall below the threshold grade, the process 300 ends.

If the grade logic algorithm 116 detects that the downhill grade 202 does fall below the threshold grade, the process 300 returns to step 312, and the grade logic algorithm 116 sends a command to the transmission controller 122 to upshift the transmission, removing the supplement to engine braking. The vehicle 200 may be traveling on a downhill grade 202 that becomes less steep, and the supplement to engine braking may no longer be required to avoid acceleration of the vehicle 200. For example, if the vehicle 200 has downshifted while the driver is pressing the brake pedal 112 to supplement engine braking, and the grade percentage changes from a 6% grade to a 4% grade, the transmission controller 122 can be configured to send a command to upshift the transmission to reduce the engine braking assistance based on the reduction in grade percentage.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. For example, in the embodiments described above, the vehicle is generally described an automobile. However, the vehicle is not limited to an automobile, as the driver interface can also be implemented with other vehicles that are generally controlled by a driver, or operator, such as boats, construction vehicles, etc. The scope of the claims is thus to be accorded the broadest interpretation so as to encompass all such modifications and equivalent structures.

What is claimed is:

1. A method of braking a vehicle on a downhill grade, comprising:
    detecting application of a vehicle brake while the vehicle traverses the downhill grade;
    detecting acceleration of the vehicle while the vehicle traverses the downhill grade; and
    based on detection of the application of the vehicle brake and detection of the acceleration of the vehicle, sending a command to downshift a transmission of the vehicle;
    determining, after the downshift of the transmission of the vehicle, at least one of the following conditions is met: (1) the application of the vehicle brake is not detected for a threshold time, (2) the acceleration of the vehicle falls below a threshold acceleration, and (3) the downhill grade falls below a threshold grade; and
    sending a command to upshift the transmission.

2. The method of claim 1, wherein detecting the application of the vehicle brake is based on at least one of detecting a driver input to a brake pedal and determining a brake switch status.

3. The method of claim 1, wherein detecting the acceleration of the vehicle is based on input from one or more wheel speed sensors.

4. The method of claim 1, wherein the threshold time is three seconds.

5. The method of claim 1, wherein the threshold acceleration is ten percent of the acceleration of gravity.

6. The method of claim 1, further comprising:
    detecting the downhill grade based on input from an inclinometer.

7. The method of claim 1, wherein the threshold grade is a predetermined grade percentage.

8. A computing device, comprising:
    one or more processors for controlling operations of the computing device; and
    a memory for storing data and program instructions used by the one or more processors, wherein the one or more processors are configured to execute instructions stored in the memory to:
    detect application of a vehicle brake while a vehicle traverses a downhill grade;
    detect acceleration of the vehicle while the vehicle traverses the downhill grade;
    based on detection of the application of the vehicle brake and detection of the acceleration of the vehicle, send a command to downshift a transmission of the vehicle;
    determine, after the downshift of the transmission of the vehicle, at least one of the following conditions is met: (1) the application of the vehicle brake is not detected for a threshold time, (2) the acceleration of the vehicle falls below a threshold acceleration, and (3) the downhill grade falls below a threshold grade; and
    send a command to upshift the transmission.

9. The computing device of claim 8, wherein the one or more processors are further configured to:
    detect the downhill grade based on input from an inclinometer.

10. A vehicle, comprising:
a vehicle brake; and
a computing device in communication with the vehicle brake, comprising:
one or more processors for controlling operations of the computing device; and
a memory for storing data and program instructions used by the one or more processors, wherein the one or more processors are configured to execute instructions stored in the memory to:
  detect application of the vehicle brake while the vehicle traverses a downhill grade;
  detect acceleration of the vehicle while the vehicle traverses the downhill grade;
  based on detection of the application of the vehicle brake and detection of the acceleration of the vehicle, send a command to downshift a transmission of the vehicle;
  determine, after the downshift of the transmission of the vehicle, at least one of the following conditions is met: (1) the application of the vehicle brake is not detected for a threshold time, (2) the acceleration of the vehicle falls below a threshold acceleration, and (3) the downhill grade falls below a threshold grade; and
  send a command to upshift the transmission.

11. The vehicle of claim 10, wherein the one or more processors are further configured to:
  detect the downhill grade based on input from an inclinometer.

* * * * *